Oct. 29, 1957     R. B. MASON     2,811,567
OXO PREPARATION OF HIGH MOLECULAR WEIGHT ALCOHOLS
Filed March 9, 1954
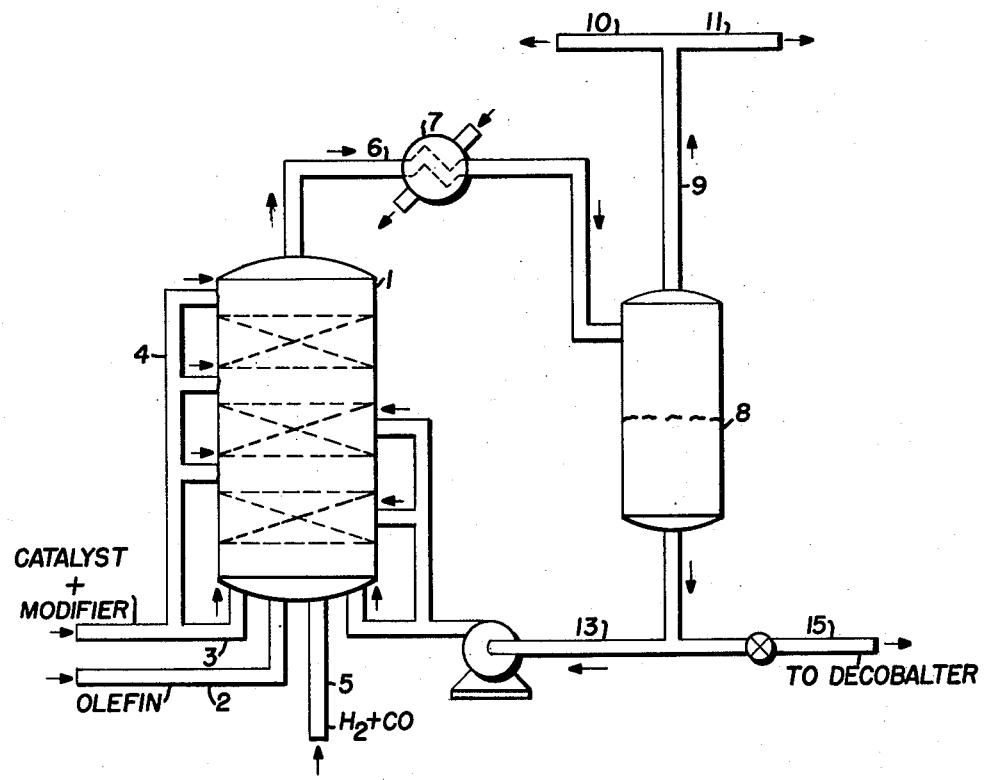
Ralph B. Mason
          Inventor
By *Henry Berk*    Attorney

United States Patent Office 2,811,567
Patented Oct. 29, 1957

2,811,567

OXO PREPARATION OF HIGH MOLECULAR WEIGHT ALCOHOLS

Ralph Burgess Mason, Baton Rouge, La., assignor to Esso Research and Engineering Company, a corporation of Delaware Application March 9, 1954, Serial No. 414,967

12 Claims. (Cl. 260—638)

The present invention relates to the preparation of oxygenated organic compounds by the reaction of olefins with hydrogen and carbon monoxide in the presence of a carbonylation catalyst. More specifically, the present invention relates to a novel process for producing high molecular weight alcohols by this reaction in substantially higher yields than has hitherto been practicable.

It is well known in the art that oxygenated organic compounds may be synthesized from organic compounds containing olefinic linkages by a reaction with carbon monoxide and hydrogen in the presence of catalyst containing metals of the iron group in a two stage process in which predominantly aldehydes and minor proportions of ketones and alcohols are formed in a first step in the presence of a carbonylation catalyst comprising metals of the iron group and particularly cobalt, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as metallic supported or unsupported nickel, copper chromite, sulfactive catalysts such as oxides and sulfides of tungsten, nickel and molybdenum and the like.

The carbonylation or Oxo reaction by which name this process is generally known, provides a particularly attractive method of preparing primary alcohols to supply the large market for plasticizers, detergents, solvents and the like. Amenable to the reaction to a greater or less degree are long and short chained olefinic compounds, not only hydrocarbons but most other organic compounds having a carbon-to-carbon olefinic linkage such as unsaturated alcohols, acids, esters and the like. Straight and branch chained olefins such as propylene, butene, pentene, hexene, heptene, styrene, olefin polymers such as di and tri-isobutylene, hexene and heptene dimers, polypropylenes, olefinic fractions from the hydrocarbon synthesis process, thermal or catalytic cracking operations and other sources of hydrocarbon fractions containing such olefins may be used as starting materials depending on the nature of the final product desired. The synthesis gas mixture fed to the first stage may be any desired ratio of $H_2$ to CO, preferably within the limits of 0.5 to 2 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p. s. i. g. and the ratio of synthesis gas to olefin may vary widely; in general, about 2,500 to 25,000 cubic feet of $H_2+CO$ per barrel of olefin feed are employed.

The catalyst for the first stage of the process is usually employed in the form of an oil-soluble compound of the catalytically active carbonylation metal. Thus there have been employed the salts of the metals such as cobalt and high molecular weight fatty acids such as stearic, oleic, naphthenic, linoleic and the like. Water soluble catalysts, such as cobalt acetate, chloride, and the like, have also been suggested. Catalyst concentrations may vary from about 0.5 to 5.0% by weight of the catalyst salt based on the olefinic feed. The first stage or carbonylation reaction is generally carried out at temperatures in the range of from about 250° to 450° F. depending upon the nature of the olefin and other reaction conditions. In general, the lower olefins will react at lower temperatures and react to a greater extent than the high molecular weight olefins. The carbonylation reaction is an exothermic one, with a heat release of the same high order or magnitude as in the hydrocarbon synthesis process, about 35 to 50 Kcal./gram-mol olefinic double bond reacted and, therefore, careful temperature control is required in the reaction zone to prevent decompostion of cobalt carbonyl to metallic cobalt and also to prevent formation of secondary reaction products and undesired reactions, such as hydrogenation of the olefin, formation of hydrocarbon synthesis product, and the like. At 3000 p. s. i. g. (1500 p. s. i. g. CO partial pressure) cobalt carbonyl starts to decompose at an appreciable rate above 350° F., thus decreasing the concentration of active catalyst. On the other hand, temperatures are preferably kept above 300° F. so as to keep the reaction rate up to a reasonable figure to insure high olefin conversions at reasonable feed rates.

Versatile as this alcohol synthesis, or "Oxo" reaction is in the production of alcohols from olefins, the process in the past has not proved itself adaptable to the preparation in good yields of high molecular weight alcohols. These compounds are of particular importance commercially in the manufacture of detergents and a multitude of other purposes. It has been found that, as the molecular weight of the olefin increases, the conversion to the aldehyde falls off rapidly and, with olefins above about 20 carbon atoms, reaction rates are too slow and yields too low for a commercially feasible operation. This rate and yield decrease with increasing molecular weight of olefin is particularly evident in the case of highly branched olefins, such as those prepared by polymerizing low molecular weight olefins, i. e., the polymers and copolymers of propylene, butylenes and amylenes.

It is, therefore, a purpose of the present invention to disclose a novel process of producing substantial yields of high molecular weight primary alcohols by the carbonylation reaction.

It is a further purpose of the present invention to produce these high molecular weight alcohols from olefins having a substantially lower molecular weight, which olefins are in considerably larger supply than high molecular weight olefins.

Other and further purposes and objects of the present invention will become more apparent hereinafter.

It has hitherto been found that, accompanying the main carbonylation reaction, i. e., the reaction wherein an olefin is converted to an aldehyde having one more carbon atom, there is formed a large number of secondary reaction products, such as esters, aldols, polymers, ketones and the like. It has now been found that, by the addition of a reaction modifier, the aldehyde synthesis reaction is directed into a completely new channel and there is formed, in high yields, a primary alcohol product having $2n+2$ carbon atoms, where an olefin with $n$ carbon atoms is passed to the carbonylation zone. Accompanying this reaction is the normal aldehyde synthesis reaction producing aldehydes and alcohols having $n+1$ carbon atoms. Other secondary reaction products are substantially absent; the normal reaction product also is formed to a substantially smaller extent than in the absence of the reaction modifier.

In accordance with the present invention, it has been found that high molecular weight alcohols may thus be produced from low molecular weight olefins by the carbonylation reaction, followed by hydrogenation, when the carbonylation stage is conducted in the presence of zinc compounds.

The process itself is conventional save for the use of modifiers mentioned above. The zinc compounds are salts of fatty acids, oxides, hydroxides, carbonates, and also metallic salts of cobalt hydrocarbonyl. These may be added in either solution or as solids from a pressurized hopper. The solution method employs one or a combination of water, olefin feed, or reaction product as the solvent, while the hopper method of addition permits the use of normally insoluble compounds such as oxides and carbonates and metal.

In accordance with the present invention, therefore, there is passed into the first stage reaction zone, along with the olefin, carbon monoxide, hydrogen, and cobalt carbonylation catalyst, a reaction modifier, preferably zinc. Though the latter may be added as a metal or as an insoluble compound, such as the oxide or carbonate, in a preferred embodiment of the invention, it is added in solution and preferably, as a salt that is soluble in the reactants or reagents. Though cobalt may be added in any form, for the active catalytic agent is the hydrocarbonyl which is synthesized in the course of the reaction and which is soluble in the olefin-aldehyde mixture, zinc does not form a carbonyl and hence, to derive the benefits associated with a homogeneous reaction system, an oil-soluble form of zinc, such as zinc oleate, is a particularly desirable reaction modifier.

The present invention will best be understood from the more detailed description hereinafter, wherein reference will be made to the accompanying drawing which is a schematic illustration of a system suitable for carrying out a preferred embodiment of the invention.

Referring now to the drawing, an olefinic hydrocarbon is fed through feed line 2 to the bottom of primary reactor 1. The latter comprises a reaction vessel preferably divided into discrete zones separated by trays and free space. The reactor is preferably packed with inert solids to facilitate gas-liquid contact.

Also passed into reactor 1 are cobalt carbonylation catalysts and zinc modifier catalyst. These may, if oil soluble, be dissolved in the olefinic feed and, in a preferred modification, a mixture of cobalt and zinc oleate is employed and is dissolved in the olefin feed admitted through line 2. It is to be understood that other forms of cobalt, such as an aqueous solution of a cobalt salt, i. e., cobalt acetate, or a slurry of oil-insoluble cobalt solids, such as cobalt oxide, metal, carbonate and the like, may be employed. Similarly, other forms of zinc, such as an aqueous solution of zinc acetate or a slurry of zinc carbonate, zinc metal and the like may also be employed, though not as effectively. Cobalt is generally added to the extent of 0.2% to 0.5% calculated as metal on olefin feed, while the zinc is added to the extent of 0.05% to 0.5%, preferably 0.1% to 0.2%.

Simultaneously, a gas mixture containing $H_2$ and CO in the approximate ratio of 0.5–2 volumes $H_2$ per mole CO is supplied through line 5 and flows concurrently with the olefinic and aldehyde product upwardly through reactor 1. The latter is preferably operated at pressures of about 2500–3500 p. s. i. g. and temperatures of 200 to 400° F.

Liquid oxygenated reaction products comprising aldehydes are withdrawn from the upper portion of reactor 1 through line 6. The product, which is at a temperature of about 300–375° F., is then passed to cooler 7, where the temperature is lowered to about 60–120° F., and then passed to high pressure gas-liquid separator 8. Herein separation of unreacted gases from liquid product occurs. The unreacted gases may be withdrawn through line 9, and after scrubbing, may be recycled to the system via line 10, or in part purged. Liquid aldehyde product containing high concentration of cobalt carbonyl is withdrawn from high pressure separator 8 through line 12. A portion of this stream is preferably passed via line 13 to aldehyde synthesis reactor 1 to supply both cooling and a portion of the catalyst requirements of that vessel, the amount of product recycled being a function of the amount of cooling required in the reactor. The recycled liquid is preferably added along the length of reactor 1.

Liquid aldehyde product not recycled to reactor 1 is passed through pressure release valve 14 and line 15. This material, containing dissolved cobalt carbonyl and zinc salts, is sent to a catalyst decomposition or decobalting zone, where in the presence of heat and steam, water, or dilute organic acid, the inorganic contaminants are removed from the aldehyde product in a manner known in the art.

The aldehyde product, substantially completely free of inorganic compounds, is then hydrogenated under conventional conditions to alcohols and the alcohol product fractionated to produce both the $n+1$ and the $2n+2$ alcohols, as described.

The process of the present invention may be further illustrated by the following specific examples wherein a heptene fraction is treated with zinc and its compounds under oxonation conditions to yield a $C_{16}$ alcohol product.

*Table I*

*Modified oxo synthesis operations*

| Run No. | A | B | C | D | E | F | G | H |
|---|---|---|---|---|---|---|---|---|
| Feed | $C_7$ Olefin | $C_7$ Olefin | $C_7$ Olefin | $C_7$ Olefin | $C_7$ Olefin | $C_7$ Olefin | $C_7$ Olefin | $C_7$ Olefin. |
| Catalyst | Cobalt Acetate. | Cobalt Acetate. | Cobalt Acetate. | Cobalt Acetate. | Cobalt Acetate. | Cobalt Oleate. | Cobalt Oleate. | Cobalt Oleate. |
| Wt. percent | 1 | 1 | 1 | 1 | 1 | 2 | 2 | 2. |
| Modifier | None | Mossy zinc | Mossy zinc | Gran. Zn | Zinc acetate | Zn Oxide | Zinc oleate | Zinc oleate. |
| Wt. percent | | 100 | 100 | 10 | 3 | .6 | 5 | 2. |
| Temperature | 350 | 250–350 | 250–350 | 250–350 | 350 | 350 | 350 | 350. |
| Hours | 12 | 3  5 | 3  12 | 10  12 | 21 | 6 | 12 | 12. |
| Pressure | 3,000 | 3,000 | 3,000 | 3,000 | 3,000 | 3,000 | 3,000 | 3,000. |
| Hydro Catalyst | Ni | Cu Chromite. | Ni | Ni | Ni | Ni | Ni | Ni. |
| Production Distribution: | | | | | | | | |
| Wt. percent Hydrocarbon | 9.3 | 2.7 | 9.7 | 16.5 | 15.3 | 9.9 | 12.4 | 8.2. |
| Wt. percent $C_8$ Alcohol | 76.0 | 37.6 | 37.4 | 42.5 | 35.1 | 37.7 | 29.0 | 28.2. |
| Wt. percent Intermediate | | 8.1 | 1.7 | 4.0 | 4.0 | 5.6 | 4.3 | 6.7. |
| Wt. percent $C_{16}$ Alcohol | 14.7 | 39.5 | 38.9 | 29.4 | 34.4 | 34.8 | 32.1 | 37.4. |
| Wt. percent $C_{16}$ Glycol | | | 3.5 | 0 | 4.9 | 0 | 0 | 0. |
| Wt. percent Bottoms | | 12.2 | 8.8 | 8.8 | 8.3 | 13.4 | [1] 22.2 | [1] 19.5. |

[1] High bottoms yield believed due to still hold up.

These data show the marked directional effect in the production of $C_{16}$ alcohol from $C_7$ olefins when zinc is added, either as metal, acetate, or oleate. It will be noted that substantially less zinc salt is required than zinc metal. In general, it is much more desirable to employ zinc salts than the metal.

The use of zinc salts has several advantages which are obvious. With the zinc added as salts in either aqueous, hydrocarbon, or product recycle solution the metal packing in the reactor is no longer necessary. Although this packing may have some additional advantages, e. g., providing temperature control, etc., the metal as such is expendable and will require replacement which will necessitate mechanical operations that will add to the cost of the process. In addition to this economic advantage the use of zinc salts as compared to the metal packed reactor offers possibilities of process control. As will be seen in subsequent paragraphs the ratios of $C_{16}$ and $C_8$ alcohol can be controlled within limits by adjusting the concentration of zinc salt. A third distinct advantage for the use of zinc salt as compared to the metal packed reactor resides in the flexibility of the process. Thus, for example, it is possible to change from a process producing only $C_8$ alcohol to one producing both $C_8$ and $C_{16}$ alcohol merely upon addition of the modifier salt. Contrawise, when market requirements for the higher boiling alcohol are non-existent, an increase in $C_8$ alcohol with a concurrent decrease in $C_{16}$ alcohol production is noted. The data are tabulated in Table II. The large intermediate cut in run K is caused by poor hydrogenation and the major portion of the cut should be credited to $C_{16}$ alcohol product.

SUMMARY TABLE II

*Zinc modified Oxo reaction, effect of zinc ion concentration*

| Run No. | I | J | K | L | M | N | O |
|---|---|---|---|---|---|---|---|
| Feed | $C_7$ Olefin | $C_7$ Olefin | $C_7$ Olefin | $C_7$ Olefin | $C_7$ Olefin | $C_7$ Olefin | $C_7$ Olefin. |
| Catalyst | Cobalt Oleate | Cobalt Oleate | Cobalt Oleate | Cobalt Acetate | Cobalt Acetate | Cobalt Acetate | Cobalt Acetate. |
| Catalyst Conc., Wt. percent $Co^{++}$ | 0.2 | 0.2 | 0.2 | 0.2 | 0.2 | 0.2 | 0.2. |
| Modifier | Zinc Oleate | Zinc Oleate | Zinc Oleate | Zinc Acetate | Zinc Acetate | Zinc Acetate | Zinc Acetate. |
| Wt. percent Modifier as $Zn^{++}$ | 0.5 | 0.2 | 0.1 | 0.2 | 0.1 | 0.05 | 0.025. |
| Temperature, °F | 400 | 375 | 390 | 350 | 350 | 350 | 350. |
| Pressure, P. s. i. g | 2,600 | 2,600 | 2,600 | 2,700 | 2,700 | 2,700 | 2,700. |
| Reaction Time, Hrs | 9 | 11 | 9 | 8 | 10 | 10 | 11. |
| Hydro Product Distribution, Wt. percent: [1] | | | | | | | |
| Hydrocarbon | 12.4 | 8.2 | 8.8 | 9.1 | 10.6 | 8.1 | 8.6. |
| $C_8$ Alcohol | 29.0 | 28.2 | 36.4 | 37.7 | 42.7 | 45.5 | 54.0. |
| Intermediate | 4.3 | 6.7 | 15.1 | 6.5 | 5.4 | 7.5 | 5.5. |
| $C_{16}$ Alcohol | 32.1 | 37.4 | 21.1 | 35.4 | 30.0 | 29.4 | 22.7. |
| $C_{16}$ Glycol | 0 | 0 | 0 | 0 | 0 | 0 | 0. |
| Bottoms | 22.2 | 20.2 | 16.1 | 10.1 | 12.3 | 10.1 | 8.8. |

[1] Oxo product hydrogenated in autoclaves over reduced Harshaw nickel catalyst using methanized hydrogen, 6 hrs., 350° F. and 3000 p. s. i. g.

the lower boiling alcohol can be produced exclusively upon removal of the modifier salt.

The effects of variations in the concentration of catalyst modifier (zinc acetate or zinc oleate) have been investigated. In general the reduction of the zinc ion concentration below 0.1 wt. percent results in decreased production of dimer alcohol. A concentration of 0.2 wt. percent appears to be optimum for maximum production of $C_{16}$ alcohol. Increasing the zinc ion concentration above this value will result in increased problems when dezincing the oxo product and does not materially increase $C_{16}$ alcohol formation. Below 0.2 wt. percent zinc Though the invention has shown at length the conversion of heptenes to $C_{16}$ alcohols, the invention is not restricted thereto. With higher boiling olefins corresponding higher boiling alcohols are produced, thus affording, for example, economical preparation of $C_{16}$–$C_{24}$ alcohols. By the straightforward Oxo reaction, low yields with $C_{15}$–$C_{23}$ olefins renders the process uneconomical.

The advantages of the modified alcohol synthesis for the production of high molecular weight alcohols is shown in Table III below. In this table there are compared the results obtained when a $C_{15}$ olefin is oxonated and hydrogenated to produce the corresponding $C_{16}$ alcohol, and when a $C_7$ fraction is oxonated in the presence of a zinc salt to produce the $C_{16}$ alcohol.

TABLE III

[Oxo Synthesis: Olefin+1:1 Synthesis Gas]

| | | | |
|---|---|---|---|
| Feed | $C_{15}$ Polymer | $C_7$ Polymer | $C_7$ Polymer. |
| Catalyst | Cobalt Oleate | Cobalt Oleate | Cobalt Oleate. |
| Conc., Wt. percent on Feed | 0.25 | 0.15 | .25 |
| Catalyst Modifier | None | Zinc Oleate | Zinc Oleate. |
| Conc., Wt. percent on Feed | | 0.15 | 0.10. |
| Reactor Temp., °F | 350 | 350 | 345. |
| Feed Rate, v./v./hr | 0.28 | .32 | .30. |
| Pressure, P. s. i. g | 3,000 | 3,050 | 3,000. |
| Total Olefin Conversion, percent | 33 | 61.5 | 80.2. |
| Total Alcohol Selectivity, percent: | | | |
| Grams $C_{16}$ Alc. Prod./100 g. Feed | 28 | 29 | 33. |
| Grams $C_8$ Alc. Prod./100 g. Feed | 0 | 34 | 51. |
| Estimated Purity $C_{16}$ Alc. Prod | 83 | 98 | |
| Corrected $C_{16}$ Alc. Yield/100 g. Olefin | 23 | 28 | |

It is thus demonstrated that a higher yield of $C_{16}$ alcohol per unit weight of olefin feed can be obtained from the $C_7$ feed with zinc oleate as a modifier. Furthermore, the alcohol product is of higher purity as determined from hydroxyl number determinations. A still further advantage for the modified oxonation of $C_7$ olefin is the substantial amount of $C_8$ alcohol which is produced simultaneously.

In Table IV there is shown the marked superiority of zinc salts as compared to zinc metal in equivalent concentrations in the production of the dimeric primary alcohol product.

TABLE IV

*Comparison of zinc metal vs. zinc salts[1] as dimeric primary alcohol synthesis*

| | | | |
|---|---|---|---|
| Feed | $C_7$ Olefin | $C_7$ Olefin | $C_7$ Olefin. |
| Catalyst | Cobalt Acetate | Cobalt Oleate | Cobalt Acetate. |
| Catalyst Conc., Wt. percent | 2% Cobalt on Feed | 2% Cobalt on Feed | 2% Cobalt on Feed. |
| Modifier | Zinc Acetate | Zinc Oleate | Mossy Zinc Metal. |
| Modifier Conc., Wt. percent | 2% Zinc on Feed | 2% Zinc on Feed | 2% Zinc on Feed. |
| Temperature, °F | 350 | 350 | 350. |
| Pressure P. s. i. g. | | 3,000 p. s. i. g. Syn. Gas (1/1 $CO/H_2$ Ratio). | |
| Hours | 9 | 11 | 9. |
| Wt. percent Principal Products:[2] | | | |
|   $C_8$ Alcohol | 37.7 | 28.2 | 48.2. |
|   Intermediate | 6.5 | 6.7 | 5.5. |
|   $C_{16}$ Alcohol | 35.4 | 37.4 | 21.7. |

[1] Autoclave studies.
[2] Based on distillation of hydrogenated product.

These data show that there is almost a two-fold increase in formation of the dimeric alcohol product when a zinc salt is used over that obtained when zinc metal is employed as the reaction modifier.

This application is a continuation-in-part of Serial No. 291,239, filed June 2, 1952 now U. S. Patent No. 2,754,332.

What is claimed is:

1. The process for converting olefinic compounds having $n$ carbon atoms in the molecule into primary alcohols having $2n+2$ carbon atoms which comprises passing said olefin, $H_2$, CO, a cobalt carbonylation catalyst, and a zinc comprising reaction modifier into a carbonylation zone, said zinc modifier being present in an amount sufficient to substantially increase the yield of said alcohols, maintaining carbonylation temperatures and pressures in said zone, withdrawing an aldehyde product from said zone, hydrogenating said product, and recovering in good yields a primary monohydric alcohol having $2n+2$ carbon atoms.

2. The process of claim 1 wherein said reaction modifier is a water insoluble and oil-insoluble form of zinc.

3. The process of claim 2 wherein said modifier is zinc metal.

4. The process of claim 1 wherein said reaction modifier is a zinc salt.

5. The process of claim 4 wherein said reaction modifier is a water soluble zinc salt.

6. The process of claim 4 wherein said reaction modifier is an oil-soluble zinc salt.

7. An improved process for producing high yields of primary monohydric alcohols having $2n+2$ carbon atoms from olefins having $n$ carbon atoms which comprises passing said olefins, $H_2$, CO, a cobalt carbonylation catalyst and a solution of a zinc salt into a carbonylation zone, said zinc salt being present in an amount sufficient to substantially increase the yield of said alcohols, maintaining temperature of from about 250°–375° F. and pressures of from about 1500–4500 p. s. i. g. in said zone, withdrawing an aldehyde comprising reaction product from said zone, removing metal-comprising components from said reaction product, hydrogenating said aldehyde product and recovering high yields of said primary alcohol product.

8. The process of claim 7 wherein said zinc salt is added to the extent of 0.05–0.5% on olefin, calculated as zinc ion.

9. The process of claim 7 wherein said zinc salt is zinc acetate dissolved in water.

10. The process of claim 7 wherein said zinc salt is zinc oleate dissolved in olefin.

11. The process of claim 7 wherein said cobalt catalyst is cobalt oleate.

12. The process of converting heptenes into primary isohexadecyl alcohols which comprises passing a heptene fraction into a carbonylation reaction zone, passing $H_2$, CO and 0.2–0.5% cobalt oleate, calculated as cobalt on olefin, into said zone, passing 0.05–0.5% zinc oleate calculated as zinc into said zone, said oleates being dissolved in said heptene fraction, maintaining temperatures of from about 250°–375° F. and pressures of from 1500–4500 p. s. i. g. in said zone, withdrawing an aldehyde comprising reaction product, freeing said product of dissolved and suspended cobalt and zinc components, hydrogenating said aldehyde product, and recovering good yields of a primary isohexadecyl monohydric alcohol product.

References Cited in the file of this patent

UNITED STATES PATENTS 2,500,210     Schexnailder     Mar. 14, 1950

OTHER REFERENCES

Wender et al.: Bureau of Mines Report of Investigations No. 4270, 1948, pgs. 1 and 4 to 11.

Karrer Organic Chemistry, Elsevier, N. Y., 1950, pgs. 164, 170.